United States Patent [19]
Geweke et al.

[11] Patent Number: 6,085,939
[45] Date of Patent: Jul. 11, 2000

[54] METHOD FOR CONTROLLING A DEVICE FOR FEEDING FLOWABLE GOODS INTO A TRANSPORT LINE

[75] Inventors: Martin Geweke, Schenefeld; Thies Lübbe, Kölln-Reisiek, both of Germany

[73] Assignee: Johannes Möller Hamburg Engineering GmbH

[21] Appl. No.: 09/068,323

[22] PCT Filed: Sep. 5, 1997

[86] PCT No.: PCT/EP97/04830

§ 371 Date: Jun. 16, 1998

§ 102(e) Date: Jun. 16, 1998

[87] PCT Pub. No.: WO98/09897

PCT Pub. Date: Mar. 12, 1998

[30] Foreign Application Priority Data

Sep. 5, 1996 [DE] Germany ............... 296 15 505 U

[51] Int. Cl.[7] .................................................. B67D 5/08
[52] U.S. Cl. ........................ 222/61; 222/637; 406/14
[58] Field of Search .................. 222/637, 61; 406/12, 406/14, 29, 30, 146

[56] References Cited

U.S. PATENT DOCUMENTS

| | | | |
|---|---|---|---|
| 4,613,259 | 9/1986 | Packer et al. ........................... | 406/30 |
| 4,775,267 | 10/1988 | Yamamoto ............................. | 406/30 |
| 4,863,316 | 9/1989 | Gianella et al. ....................... | 406/14 |

*Primary Examiner*—Philippe Derakshani
*Attorney, Agent, or Firm*—Robert W. Becker & Associates

[57] ABSTRACT

A method for controlling a device for feeding dust-like or finely granular flowable material from at least one conveying container into a transport line, wherein the conveying containers for removal of the flowable material are simultaneously supplied with pressure and emptied, whereby, after pressure relief, the conveying containers are filled again with flowable material, includes the step of determining the optimal amount of flowable material with regard to the specific device parameters for a maximum possible filling level of the conveying containers. The amount of flowable material removed from the conveying containers is determined based on the measured relevant transporting parameters. The amount of flowable material removed is compared to the optimal amount of material to be transported. The interval between the transport cycles is extended or shortened when deviations of the amount of flowable material, removed during the last or previous transport cycle, from the optimal amount of flowable material to be transported are detected.

5 Claims, 1 Drawing Sheet

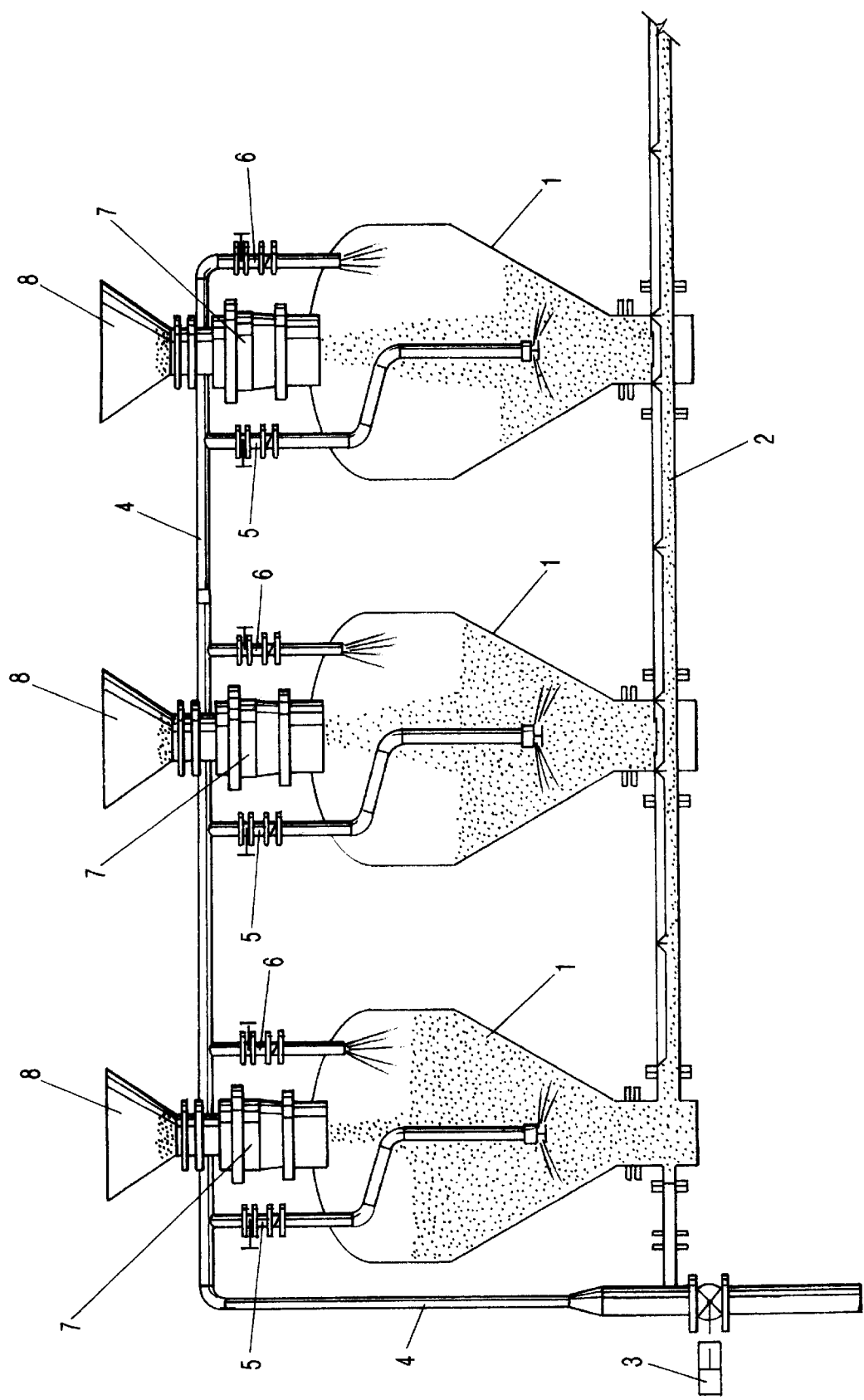

METHOD FOR CONTROLLING A DEVICE FOR FEEDING FLOWABLE GOODS INTO A TRANSPORT LINE

BACKGROUND OF THE INVENTION

The invention relates to a method for controlling a device for feeding dust-like or finely granular flowable material from at least one conveying container into a common transport line in which the conveying container(s) for removing the flowable material are simultaneously supplied with pressure and emptied whereby, after pressure relief, flowable material is again filled in.

Such pneumatic conveying devices are known in different embodiments. For a batch-wise filling of the conveying containers, when the flowable material is supplied non-uniformly, and for starting the conveying action as a function of the filling level of the conveying containers, idle time will result which lowers the transporting efficiency of the device. Therefore, an average transporting efficiency for the device will result which is considerably below the optimal transporting capacity of the system. Especially the filling level indicators which start the conveying action are prone to malfunction.

Pneumatic transporting devices for finely granular or dust-like flowable material without filling level indicators are known. In these devices, independent of the respective supply of flowable material, the conveying action is initiated in a predetermined sequence. This operating method is not economical because the device is not operated at its optimal operating point which results in very energy consumption.

It is therefore an object of the invention not only to eliminate the malfunction rate of pneumatic transport devices but also to lower the energy consumption.

SUMMARY OF THE INVENTION

Inventively, this object is solved in that the optimal amount of flowable material that can be transported by the device is determined for maximum possible filling level of the transport device, the amount of flowable material removed during emptying of the transporting device is determined, based on measured relevant transport parameters, i.e., at least pressure during the transporting cycle as well as transporting time, and is compared with the optimal amount of material to be transported, and when deviations of the optimal amount of material to be transported are detected, the interval between the transport cycles is changed by predetermined time periods.

In the inventive method for controlling a device for feeding dust-like or finely granular flowable material from pressure-loaded conveying devices into a transport line, the amount of flowable material of the last or previous transport cycles is detected based on the transport-technological data and is compared to the amount to be transported under optimal conditions in the device. When changing (shortening or extending) the interval, preferably by predetermined or calculated time periods, between sequentially performed transport cycles, it is ensured with the invention in a simple manner that the conveying containers are filled to the maximum level before starting a transport cycle, so that not only an operation of the device under optimal conditions is ensured, but also operational malfunctions of the device caused by mechanical elements which determine the start of the transport, for example, filling level indicators, are avoided.

BRIEF DESCRIPTION OF THE DRAWINGS

The inventive method will be explained in the following with the aid of an embodiment and the accompanying drawing, which shows a schematic cross-sectional view of a pneumatic transport device.

DESCRIPTION OF PREFERRED EMBODIMENTS

FIG. 1 shows a simplified representation of an example of a device for feeding dust-like or finely granular flowable material from three conveying containers 1 into a common pneumatic transport line 2.

The conveying containers 1 open directly into the transport line 2 which is connected by valve 3 to a compressed air source (not shown). An air supply line 4 is also connected to the compressed air source by valve 3 whereby branch lines 5 and 6 are branched off to the conveying containers 1.

Into each one of the conveying containers 1 a flowable material supply line 7 opens which is connected to the outlet 8 of a hopper. The flowable material supply lines 7 comprise a shut-off device (not shown) that during filling of the conveying container 1 is open and during conveying of the flowable material into the transport line 2 is closed.

For simultaneously feeding the flowable material contained in the transport device I into the transport line 2, the valve 3 is opened and at the same time the shut-off devices within the flowable material supply lines 7 are closed so that the air supply line 4, including the branch lines 5 and 6, as well as the transport line 2 are supplied with the conveying means, for example, compressed air. The flowable material to be transported thus will flow simultaneously from all conveying containers 1 into the transport line 2. After emptying of the conveying containers 1, the valve 3 and the shut-off devices within the flowable material supply lines 7 are switched and the conveying containers 1 are again filled with flowable material in order to subsequently be emptied in the manner disclosed above. The length of the interval between the individual transporting cycles (emptying of the conveying containers 1) is inventively determined based on a comparison of the amount of flowable material transported during the last or second-to-last transport cycle, which amount can be determined based on the transport-technological data (pressure measured by a pressure measuring device during the transport cycle, transport time measured by a timing device, density and temperature measured by a temperature measuring device of the flowable material, conveying length, mass flow, temperature measured by a temperature measuring device, local density as well as specific frictional coefficient of the conveying medium), with the amount of material to be transported in the device under optimal conditions.

The present invention is, of course, in no way restricted to the specific disclosure of the specification and drawings, but also encompasses any modifications within the scope of the appended claims.

What is claimed is:

1. A method for controlling a device for feeding dust-like or finely granular flowable material from at least one conveying container into a transport line, wherein the at least one conveying container is simultaneously supplied with pressure which empties the dust-like or finely granular flowable material, whereby, after the pressure is removed, the at least one conveying container is filled again with the flowable material, this process comprising a transport cycle, said method comprising the steps of:

a) providing a predetermined optimal amount of flowable material based on relevant transport-technological data for a maximum possible filling level of the at least one conveying container;

b) measuring an amount of flowable material emptied from the at least one conveying container during a preceding transport cycle, based on the relevant transport-technological data;

c) determining a deviation by comparing the measured amount of flowable material emptied in step b) to the predetermined optimal amount of flowable material to be transported in step a); and d) adjusting a time interval between a next transport cycle from the preceding transport cycle when the deviation in step c) is present.

2. A method according to claim 1, wherein said step b) the relevant transport-technological data comprise the pressure during the transport cycle and a transport time.

3. A method according to claim 1, wherein in said step d) the interval is changed by predetermined time periods.

4. A method according to claim 1 further comprising repeating steps a) through d) for a next at least one conveying container.

5. A method according to claim 3 wherein the relevant transport-technological data further comprises density and temperature of the flowable material, a conveying length, mass flow, temperature, local density, and specific frictional coefficient of a conveying medium.

* * * * *